US009731255B2

(12) United States Patent
Black et al.

(10) Patent No.: US 9,731,255 B2
(45) Date of Patent: Aug. 15, 2017

(54) FEEDBACK CONTROLLED CONCRETE PRODUCTION

(71) Applicants: Melvin L. Black, Pacifica, CA (US); Todd W. Black, Pacifica, CA (US)

(72) Inventors: Melvin L. Black, Pacifica, CA (US); Todd W. Black, Pacifica, CA (US)

(*) Notice: Subject to any disclaimer, the term of this patent is extended or adjusted under 35 U.S.C. 154(b) by 637 days.

(21) Appl. No.: 13/907,696

(22) Filed: May 31, 2013

(65) Prior Publication Data
US 2014/0355372 A1    Dec. 4, 2014

(51) Int. Cl.
| | | |
|---|---|---|
| *B28C 7/04* | (2006.01) | |
| *B01F 7/00* | (2006.01) | |
| *B01F 7/16* | (2006.01) | |
| *B01F 7/18* | (2006.01) | |
| *B01F 13/10* | (2006.01) | |
| *B01F 15/02* | (2006.01) | |
| *B01F 15/04* | (2006.01) | |
| *B01F 3/12* | (2006.01) | |
| *B28C 7/02* | (2006.01) | |
| *B28C 9/00* | (2006.01) | |
| *G01G 19/22* | (2006.01) | |

(52) U.S. Cl.
CPC ........ *B01F 7/00216* (2013.01); *B01F 3/1271* (2013.01); *B01F 7/162* (2013.01); *B01F 7/18* (2013.01); *B01F 13/1055* (2013.01); *B01F 15/0229* (2013.01); *B01F 15/0234* (2013.01); *B01F 15/0293* (2013.01); *B01F 15/0445* (2013.01); *B28C 7/02* (2013.01); *B28C 7/0418* (2013.01); *B28C 7/0422* (2013.01); *B28C 7/0481* (2013.01); *B28C 9/002* (2013.01); *G01G 19/22* (2013.01); *B01F 2215/0481* (2013.01)

(58) Field of Classification Search
CPC .................................................... B28C 7/0436
USPC .............................................. 366/16–18, 43
See application file for complete search history.

(56) References Cited

U.S. PATENT DOCUMENTS

| | | | |
|---|---|---|---|
| 3,306,589 | A | 2/1967 | Uden |
| 3,395,834 | A | 8/1968 | Troy |
| 3,456,179 | A | 7/1969 | Joslin |
| 3,596,759 | A | 8/1971 | King et al. |
| 3,695,427 | A | 10/1972 | Friesz |
| 3,727,894 | A | 4/1973 | Ahrenberg |

(Continued)

FOREIGN PATENT DOCUMENTS

| | | |
|---|---|---|
| BE | 646885 | 8/1964 |
| DE | 3307977 | 9/1984 |

(Continued)

OTHER PUBLICATIONS

Various Product Brochures of Concrete Mixers and Plants, dates unknown.

(Continued)

*Primary Examiner* — David Sorkin

(57) ABSTRACT

Techniques or processes for efficiently producing concrete using dynamic feedback are disclosed. A concrete plant can use a control system to manage concrete production based on the dynamic feedback. The dynamic feedback can control mixing of concrete ingredients so as to yield uniform particle distribution for the concrete ingredients. The dynamic feedback can also avoid overflow situations as well as yield improved loading of the resulting concrete into a concrete transport vehicle (e.g., concrete truck).

22 Claims, 12 Drawing Sheets

(56) References Cited

U.S. PATENT DOCUMENTS

| | | |
|---|---|---|
| 3,886,063 A | 5/1975 | Friesz |
| 3,905,586 A | 9/1975 | Wall, Jr. |
| 3,986,708 A | 10/1976 | Heltzel et al. |
| 3,997,434 A | 12/1976 | Macauley, Jr. |
| 4,002,891 A | 1/1977 | Porter |
| 4,091,463 A | 5/1978 | Tschudy et al. |
| 4,127,478 A | 11/1978 | Miller |
| 4,204,773 A | 5/1980 | Bates |
| 4,207,176 A | 6/1980 | Hood |
| 4,225,357 A | 9/1980 | Hodson |
| 4,226,542 A | 10/1980 | Black et al. |
| 4,285,808 A | 8/1981 | Horton |
| 4,298,288 A | 11/1981 | Weisbrod |
| 4,395,128 A | 7/1983 | Mathis et al. |
| 4,435,081 A | 3/1984 | Del Fabbro |
| 4,436,429 A | 3/1984 | Strong et al. |
| 4,488,815 A | 12/1984 | Black |
| 4,624,575 A | 11/1986 | Lantz |
| 4,657,871 A | 4/1987 | Freakley et al. |
| 4,818,113 A | 4/1989 | Patel |
| 4,865,457 A | 9/1989 | Strehlow |
| 5,149,192 A | 9/1992 | Hamm et al. |
| 5,186,840 A | 2/1993 | Christy et al. |
| 5,213,414 A | 5/1993 | Richard et al. |
| 5,433,521 A | 7/1995 | Inoue et al. |
| 5,452,954 A * | 9/1995 | Handke .............. B28C 7/02 137/4 |
| 5,556,198 A | 9/1996 | Dickson et al. |
| 5,718,508 A | 2/1998 | Williams |
| 5,829,344 A | 11/1998 | Lande |
| 5,843,315 A | 12/1998 | Baughn et al. |
| 6,126,307 A | 10/2000 | Black |
| 6,325,311 B1 | 12/2001 | Preisser |
| 6,341,889 B1 | 1/2002 | Noda et al. |
| 6,758,590 B1 | 7/2004 | Black |
| 2006/0233039 A1* | 10/2006 | Dykstra ............ B01F 15/00207 366/8 |
| 2008/0273415 A1* | 11/2008 | Thornton ................ B28C 5/468 366/3 |
| 2010/0172202 A1* | 7/2010 | Borgstadt ............ B01F 13/1013 366/15 |

FOREIGN PATENT DOCUMENTS

| | | |
|---|---|---|
| FR | 2650617 | 2/1991 |
| GB | 1104827 | 2/1968 |
| GB | 2147215 | 5/1985 |
| SU | 922095 | 4/1982 |
| SU | 1615167 | 12/1990 |
| WO | WO 96/28290 | 9/1996 |

OTHER PUBLICATIONS

"How Does the Autocon Mixer Work?" Specification Sheet for the Autocon Continuous Mixers, Product Brochure for Autocon Continuous Mixers, St. Helena, CA, dates unknown.

"Cost Saving Analysis NIKKO Spiral Flow, Twin Shaft Concrete Mixing System a Typical North American Dry Batch Concrete System", comparison data from Lakeside Sand and Gravel, date unknown.

Bob Ober, "Traditional uses blur as mixing booms a science", Aberdeen's Concrete Journal & Trader, The Abderdeen Group, Aug. 1993.

* cited by examiner

| ITEM | DESIGNATED BY MIX DESIGN | | | | | FULLY MIXED | | | | | FULL SCALE VDC | % SCALE CAP | FULL SCALE CAP-KIPS |
|---|---|---|---|---|---|---|---|---|---|---|---|---|---|
| | BATCH WEIGHT | SG | BULK SG | BULK VOL CF | % BULK VOIDS | SG-WGT LOAD | SG-WGT MIX DISCH | VOL CF | SG-VOL LOAD | SG-VOL MIX DISCH | | | |
| SAND | 9541.3 | 2.65 | 1.60 | 95.50 | 39 | 0.579 | 1.295 | 57.70 | 0.566 | 1.128 | 10.00 | 0.318 | 30 |
| CEMENT | 6392.0 | 3.10 | 1.50 | 68.30 | 52 | 0.453 | 1.015 | 33.04 | 0.379 | 0.756 | 10.00 | 0.639 | 10 |
| FLYASH | 1598.0 | 2.00 | 1.10 | 23.30 | 45 | 0.073 | 0.164 | 12.80 | 0.095 | 0.188 | 10.00 | 0.799 | 2 |
| WATER | 1995.8 | 1.00 | 1.00 | 31.98 | 0 | 0.046 | 0.102 | 31.98 | 0.118 | 0.236 | 10.00 | 0.399 | 5 |
| TOTAL MIXING | 19528.8 | | | | | 1.593 | 2.578 | 135.52 | | 2.309 | | | |
| ROCK | 24171.3 | 2.88 | 1.80 | 215.00 | 37 | 1.593 | | 134.50 | 1.435 | | 10.00 | 0.806 | 30 |
| TOTAL LOAD | 43698.1 | | | | | 2.744 | | 270.02 | 2.593 | | | | |

FIG. 1C

FEEDBACK CONTROLLED CONCRETE PRODUCTION

BACKGROUND OF THE INVENTION

The traditional way to make concrete in ready mix plants is to place sand, gravel and cement in separate hoppers feeding a drum or mixer which discharges into a concrete truck having a rotating drum to further mix en route to a job site where the cement is poured into the desired location, where it solidifies into concrete. Because the physical characteristics of each of the ingredients varies so much, traditional plants use powerful motors to mix, and the motors waste energy, and are inefficient. Typically, a batch will be twelve cubic yards of material premixed at the plant without water, and then placed in the concrete truck for further mixing by tumbling.

These traditional plants often do not have uniform mixing because of the large batch size and the differences in particle size among cement, fly ash, sand and aggregate. Water, if it is present, does not facilitate mixing, and sometimes hinders mixing when ingredients have hydrophobic surfaces. Also, the stiffness of the concrete affects the mixing characteristics. That is, high strength concrete has greater stiffness than low strength concrete, and the higher the strength, the more difficult it is to get complete mixing.

The strength of the concrete is measured by a variety of techniques, one of them is "slump," an analog of the strength of the concrete. Slump is determined by taking a cone-shaped receptacle filled with mixed, but not set, concrete 16 inches deep, turning the receptacle upside down on a horizontal surface, and releasing the cone. As the cone slumps when unsupported by the receptacle, it indicates the stiffness of the concrete. A slump of four inches, for example, indicates a relatively weak concrete, while a slump of one inch indicates a relatively strong concrete. The strongest concrete has zero slump. It will be apparent that a concrete that does not slump does not mix as readily as one that inherently oozes around the ingredients to achieve better mixing.

If there is inadequate mixing, there are pockets of unmixed materials that will be either voids or non-adhering particles, either of which leads to a lower average strength. This has led designers of sky-scrapers, for example, to demand higher strength than would otherwise be called for in order to be sure the average strength meets the requirements. This over-engineering leads to unnecessary costs that could be avoided by thorough mixing.

The desire for adequate mixing is also reflected in the mixing cycles. If a plant normally has a 60 second mixing cycle for a 12 yard batch, the operator will run the plant at 60 seconds even with an 8 yard batch, just to be sure the mixing is adequate. This wastes energy and also leads to reduced throughput of the concrete plant with different sized batches.

Continuous mixing at concrete production plants can be stationary or mobile and can produce concrete very quickly. However, conventionally a skilled operator (i.e., batch operator) of the concrete production plant would be needed to manage the concrete production. Unfortunately, if the operator were not closely monitoring the concrete production, the processing can backup and overflow at one or more processing locations. Hence, there is a continuing need to enhance operation of continuous mixing concrete production plants.

SUMMARY

The invention pertains to techniques or processes for efficiently producing concrete using dynamic feedback. A concrete plant can use a control system to manage concrete production based on the dynamic feedback. The dynamic feedback can control mixing of concrete ingredients so as to yield uniform particle distribution for the concrete ingredients. The dynamic feedback can also avoid overflow situations as well as yield improved loading of the resulting concrete into a concrete transport vehicle (e.g., concrete truck).

The invention can be implemented in numerous ways, including as a method, system, device, or apparatus. Several embodiments of the invention are discussed below.

According to one embodiment, a concrete mixing and loading system can, for example, include a mixer, a material delivery subsystem configured to provide a plurality of ingredients for making concrete to the mixer, and a loading hopper configured to hold at least the mixed material from the mixer that is to be provided to a transport device. In addition, the concrete mixing and loading system can also include a mixer sensor coupled to the mixer and configured to sense an amount of material in the mixer being mixed, and a hopper sensor coupled to the loading hopper and configured to sense an amount of material in the loading hopper. The concrete mixing and loading system can also include a control system operatively connected to the mixer sensor and the hopper sensor. The control system can control operation of one or more of the mixer and the material delivery subsystem based on data received from at least one of the mixer sensor and the hopper sensor.

As a method for controlled mixing of concrete in a manner, one embodiment can, for example, include at least: proportionately providing ingredients to be mixed to a continuous mixing station; mixing the ingredients at the continuous mixing station; monitoring an amount of the ingredients being mixed at the continuous mixing station; controllably discharging the mixed ingredients from the continuous mixing station; providing the discharged mixed ingredients to a loading station; monitoring an amount of material at the loading station; and adapting the proportionately providing ingredients to the continuous mixing station and/or the controllably discharging of the mixed ingredients from the continuous mixing station based on the monitored amount of the ingredients at the continuous mixing station and/or the monitored amount of the material at the loading station.

As a non-transitory computer readable medium including at least computer program code for controlling for mixing concrete, one embodiment of the computer readable medium includes at least: computer program code for proportionately controlling at least (i) delivery of a first ingredient to be mixed to a continuous mixing station, and (ii) delivery of a second ingredient to be mixed to the continuous mixing station; computer program code for controlling mixing of ingredients at the continuous mixing station, the ingredients including at least the first ingredient and the second ingredient; computer program code for monitoring an amount of the ingredients being mixed at the continuous mixing station; computer program code for controllably discharging the mixed ingredients from the continuous mixing station so as to supply the discharged mixed ingredients to a loading station; computer program code for monitoring an amount of material at the loading station; and computer program code for adapting the controllably discharging of the mixed ingredients from the continuous mixing station based on the monitored amount of the material at the loading station.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 1C is a table of a program settings for concrete production according to one embodiment.

DETAILED DESCRIPTION OF EMBODIMENTS OF THE INVENTION

The invention pertains to techniques or processes for efficiently producing concrete using dynamic feedback. A concrete plant can use a control system to manage concrete production based on the dynamic feedback. The dynamic feedback can control mixing of concrete ingredients so as to yield uniform particle distribution for the concrete ingredients. The dynamic feedback can also avoid overflow situations as well as yield improved loading of the resulting concrete into a concrete transport vehicle (e.g., concrete truck).

Embodiments of the invention are discussed below with reference to FIGS. 1A-7. However, those skilled in the art will readily appreciate that the detailed description given herein with respect to these figures is for explanatory purposes as the invention extends beyond these limited embodiments.

Figure 1A:
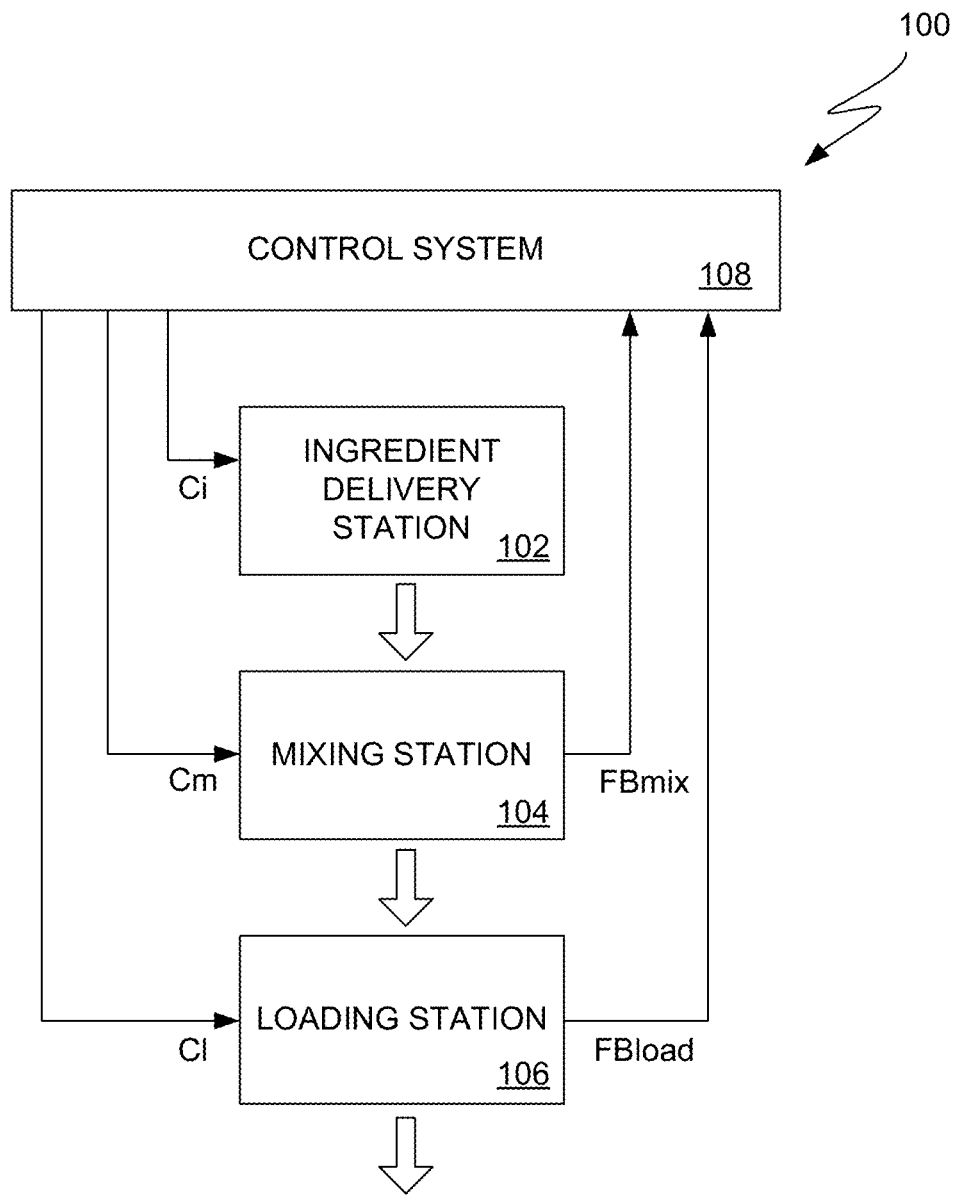
FIG. 1A is a block diagram of a concrete production system according to one embodiment.

FIG. 1A is a block diagram of a concrete production system 100 according to one embodiment. The concrete production system 100 includes an ingredient delivery station 102 that provides a plurality of distinct ingredients that are used in producing concrete. The ingredients are typically separately provided in their appropriate proportions to a mixing station 104. At the mixing station 104, the ingredients that have been received can be mixed to form a mixture, namely, a concrete base mixture. The mixing performed by the mixing station 104 can be a continuous mixing, whereby the resident mixing time is relatively short. For example, the resident mixing time can be less than 2 min and more particularly in the range of 5-60 seconds. The concrete-base mixture that is formed by the mixing provided at the mixing station 104 can then be provided to a loading station 106. At the loading station 106, the concrete-base mixture can be staged for loading into a concrete transport vehicle, such as a concrete truck. In one embodiment, an additional ingredient, namely, an aggregate, can be delivered to the loading station 106. The aggregate, if provided, is eventually mixed with the concrete base mixture to form concrete. While the loading station 106 could provide some mixing of the aggregate with the concrete base mixture, such mixing is typically deferred until the aggregate and the concrete-base mixture are provided to the concrete transport vehicle which typically provides a mixing action. For example, a concrete truck typically includes a mixing drum that spins so as to provide a mixing action for the base concrete mixture and the aggregate.

The concrete production system 100 also includes a control system 108. The control system 108 can provide overall control to the ingredient delivery station 102, the mixing section 104 and the loading station 106. The control system 108 can provide closed-loop feedback so that the control system can provide dynamic rate adjustments to any of the stations. In particular, the mixing station 104 can provide mixing feedback (FBmix) to the control system 108. The mixing feedback can, in one embodiment, indicate an amount of materials being mixed at the mixing station 104. In one implementation, the amount of materials being mixed at the mixing station 104 can be determined by a sensor provided at the mixing station 104. The sensor, for example, can be an electrical load sensor or scale. In addition, the loading station 106 can provide loading feedback (FBload) to the control system 108. The loading feedback can, in one embodiment, indicate an amount of materials that have accumulated at the loading station 106. In one implementation, the amount of materials that have accumulated that the loading station 106 can be determined by a sensor provided at the loading station 106. The sensor, for example, can be an electronic load sensor or scale.

The control system 108 can operate to produce concrete in accordance with a particular batch design. The batch design governs the proportionate quantities of the ingredients that are delivered to the mixing station 104 by the ingredient delivery station 102. In this regard, the control system 108 can provide at least one control signal (Ci) to the ingredient delivery station 102 to control the delivery of the ingredients from the ingredient delivery station 102 to the mixing station 104. The batch design can also indicate a resident mixing time or other parameter that governs how long or how much energy is to be introduced by the mixer at mixing station 104. The control system 108 can provide a control signal (Cm) to the mixing section 104 to control the resident mixing time or other parameter. The control signal (Cm) provided to the mixing station 104 can also control the rate of discharge of the concrete base material that has been mixed at the mixing station 104 to the loading station 106. Still further, the control system 108 can provide a control signal (Cl) to the loading station 106. The control signal (Cl) can be used by the loading station 106 to control the rate of discharge of the accumulated material at the loading station 106 to a concrete transport vehicle.

Figure 1B:
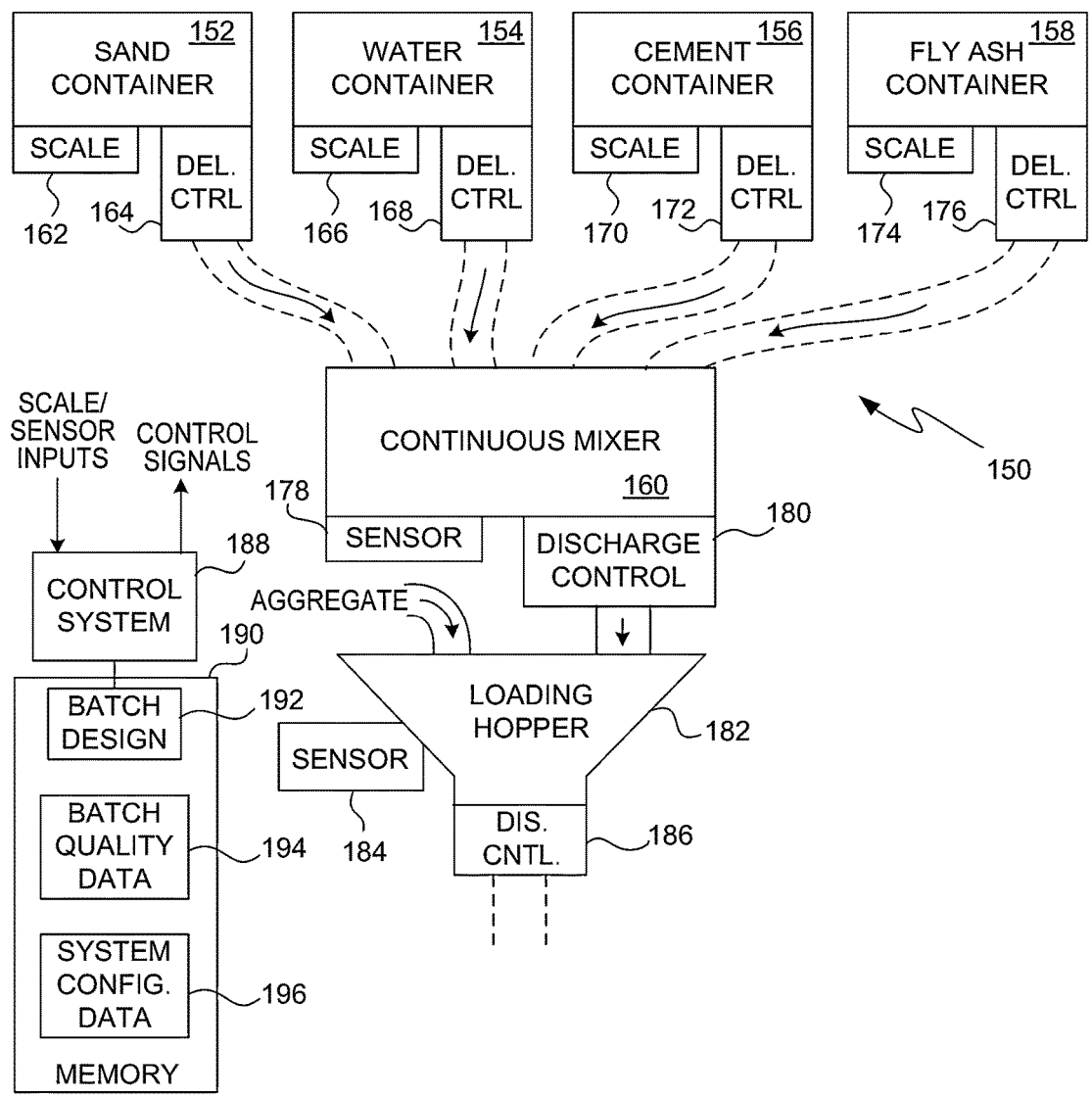
FIG. 1B is a block diagram of a concrete production system according to one embodiment.

FIG. 1B is a block diagram of a concrete production system 150 according to one embodiment. The concrete production system 150 provides a sand container 152, a water container 154, a cement container 156, and a fly ash container 158. These containers 152-158 serve to store and supply ingredients to a continuous mixer 160. The sand, water, cement and fly ash provided in the containers 152-158 are ingredients for production of concrete. In one embodiment, the containers 152-158 store a batch amount of each respective ingredient for a given concrete mix design. That is, for a given concrete mix design, the quantity and proportions of these ingredients can vary. The resulting strength of the concrete mix design can be dependent upon these ingredients and how well they are mixed.

The concrete production system 150 also operates in a computerized manner to control the delivery of these ingredients from the respective containers 152-158 to the continuous mixer 160. More particularly, the sand container 152 includes a quantity of sand that is to be supplied to the continuous mixer 160 for producing a batch of concrete. A scale 162 is coupled to the sand container 152 and provides a weight indication for the amount of sand resident in the sand container 152. A delivery control mechanism 164 can be electronically controlled to manage the rate of discharge of the sand to the continuous mixer 160. For example, the delivery control mechanism 164 can include a gate or valve that can be electronically controlled. The concrete production system 150 can also include a conveyor belt and/or a hopper to assist with delivery of the sand to the continuous mixer.

The water container 154 includes a quantity of water that is to be supplied to the continuous mixer 160 for producing a batch of concrete. A scale 166 is coupled to the water container 154 and provides a weight indication for the amount of water resident in the water container 152. A delivery control mechanism 168 can be electronically controlled to manage the rate of discharge of the water to the continuous mixer 160. For example, the delivery control mechanism 164 can include a gate or valve that can be electronically controlled. The concrete production system 150 can also include a pipe to assist with delivery of the water to the continuous mixer 160.

The cement container 156 includes a quantity of cement that is to be supplied to the continuous mixer 160 for producing a batch of concrete. A scale 170 is coupled to the cement container 156 and provides a weight indication for the amount of cement resident in the cement container 156. A delivery control mechanism 172 can be electronically controlled to manage the rate of discharge of the cement to the continuous mixer 160. For example, the delivery control mechanism 172 can include a gate or valve that can be electronically controlled. The concrete production system 150 can also include a conveyor belt and/or a hopper to assist with delivery of the cement to the continuous mixer 160.

The fly ash container 158 includes a quantity of fly ash that is to be supplied to the continuous mixer 160 for producing a batch of concrete. A scale 174 is coupled to the fly ash container 158 and provides a weight indication for the amount of fly ash resident in the fly ash container 158. A delivery control mechanism 176 can be electronically controlled to manage the rate of discharge of the fly ash to the continuous mixer 160. For example, the delivery control mechanism 176 can include a gate or valve that can be electronically controlled. The concrete production system 150 can also include a conveyor belt and/or a hopper to assist with delivery of the fly ash to the continuous mixer 160.

Once the respective ingredients being proportionately received at the continuous mixer 160, the continuous mixer operates to mix together these ingredients. Since the continuous mixer 160 serves to continuously mix the ingredients, there is a continuous inward flowing of ingredients and a continuous outward flowing of a base concrete mixture. A sensor 178 can be coupled to the continuous mixer 160 so that the amount of ingredients or material being mixed by the continuous mixer 160 can be monitored. For example, the sensor 178 can correspond to a load sensor that is able to provide an indication of the load or weight of the ingredients being mixed by the continuous mixer 160. A discharge control mechanism 180 can also be coupled to the continuous mixer 160 so as to permit control the rate of discharge of the base concrete mixture from the continuous mixer 160 to a loading hopper 182.

In one embodiment, the concrete mix design can include aggregate as another ingredient. The concrete production system 150 cam thus also deliver a controlled amount of aggregate to the loading hopper 182. A sensor 184 can be coupled to the loading hopper 182 and configured to provide an indication of the amount of material resident in the loading hopper 182. For example, the resident material within the loading hopper 182 would typically be the base concrete mixture from the continuous mixer 160 and perhaps the aggregate being supplied to the loading hopper 182. The loading hopper 182 may or may not provide mixing of the base concrete material and the aggregate. A discharge control mechanism 186 can be coupled to the loading hopper 182 and utilized to control the rate of discharge of the material within the loading hopper 182 to another container, such as a concrete transport vehicle (e.g., concrete truck).

The concrete production system 150 can also utilize a control system 188 that provides computerized operation of the concrete production system 150. The control system 188 can couple to a memory 190. The memory 190 can store various types of data. In one embodiment, the memory 190 can store batch designs 192 for concrete that can be made, batch quality data 194, and system configuration data 196. The batch designs 192 to represent particular concrete formulations that can be produced by the concrete production system 100. Under the control provided by the control system 188, the concrete production system 150 can produce batches of concrete in accordance with any of the batch designs 192. The batch quality data 194 can represent data that is archived for each batch of concrete being produced so that if a subsequent audit or need for the data arises the quality data associated with a given batch can be retrieved from the batch quality data 194 stored in the memory 190. The system configuration data 196 can represent timing values, capacities, maintenance information, calibration data, and the like for the concrete production system 150.

The control system 188 provides computerized and dynamic control of the concrete production by the concrete reduction system 150. In this regard, the control system 188 receives scale and sensor inputs from the various scales 162, 166, 170 and 174 as well as the sensors 178 and 184. Using the scale/sensor inputs, the control system 188 can operate to control concrete production in accordance with tolerance ranges so that concrete can be produce rapidly and in a consistent manner in accordance with appropriate batch designs. In any case, the control system 188 can output control signals to dynamically control the operation of the concrete production. The control signals can be provided to the delivery control mechanisms 164, 168, 172 and 176 as well as the discharge control mechanisms 180 and 186, so that the degree, rate or efficiency of the delivery or discharge can be controlled. In particular, the sensor 184 provides feedback from the loading hopper 182 to the control system 188. The sensor 178 provides feedback from the continuous mixer 160 to the control system 188. The control system 188 can then manage the operational speed, rate or flow of the various components of the concrete production system 150 to maintain consistent and continuous concrete production.

FIG. 1C is a table 198 of a program settings for concrete production according to one embodiment. The table 198 representing production of a 10 cubic yard batch size mix design for a bulk specific gravity (SSD). The mix design calls for 8.5 sack, 0.25 water/cement ratio. 20% fly ash, 30% sand, 70% rock.

Some equations pertaining to a batch of concrete being produced are the following Equations 1, 2 and 3.

$$\text{FULLY MIXED MIXER DISCHARGE } SG = \frac{\begin{array}{c}(\text{SAND } SG \times WGT \text{ SAND\#}) + \\ (\text{CEM } SG \times WGT \text{ CEM\#}) + \\ (\text{FLYASH } SG \times WGT \text{ FLYASH\#}) + \\ (\text{WATER } SG \times WGT \text{ WATER\#})\end{array}}{\begin{array}{c}\text{TOTAL } WGT \text{ SAND} + \\ \text{CEM} + \text{FLYASH} + \text{WATER}\end{array}} \quad [\text{Equation 1}]$$

$$\text{SCALE BATCH WEIGHT\#} = \frac{\text{BATCH COMPLETE } VDC}{\text{FULL SCALE } VDC} \times \text{FULL SCALE CAPACITY\#} \quad [\text{Equation 2}]$$

$$\text{FULLY MIXED VOL } C.F. = \frac{\text{BATCH WEIGHT\#}}{SG(\text{VOL}) \times 62.4(\text{WATER\#}/CF} \quad [\text{Equation 3}]$$

As an example, using the concrete production system described herein, such a batch of concrete can be produced in about two (2) minutes. The resident mixing time (RTM) for the continuous mixing approach described herein can be computed by the following Equation 4.

$$\text{RESIDENT MIXING TIME}(RTM) = \frac{\text{WEIGHT MIXING BED \#}}{\text{MIXER THROUGHPUT \#/SEC}} \quad [\text{Equation 4}]$$

Figure 2:
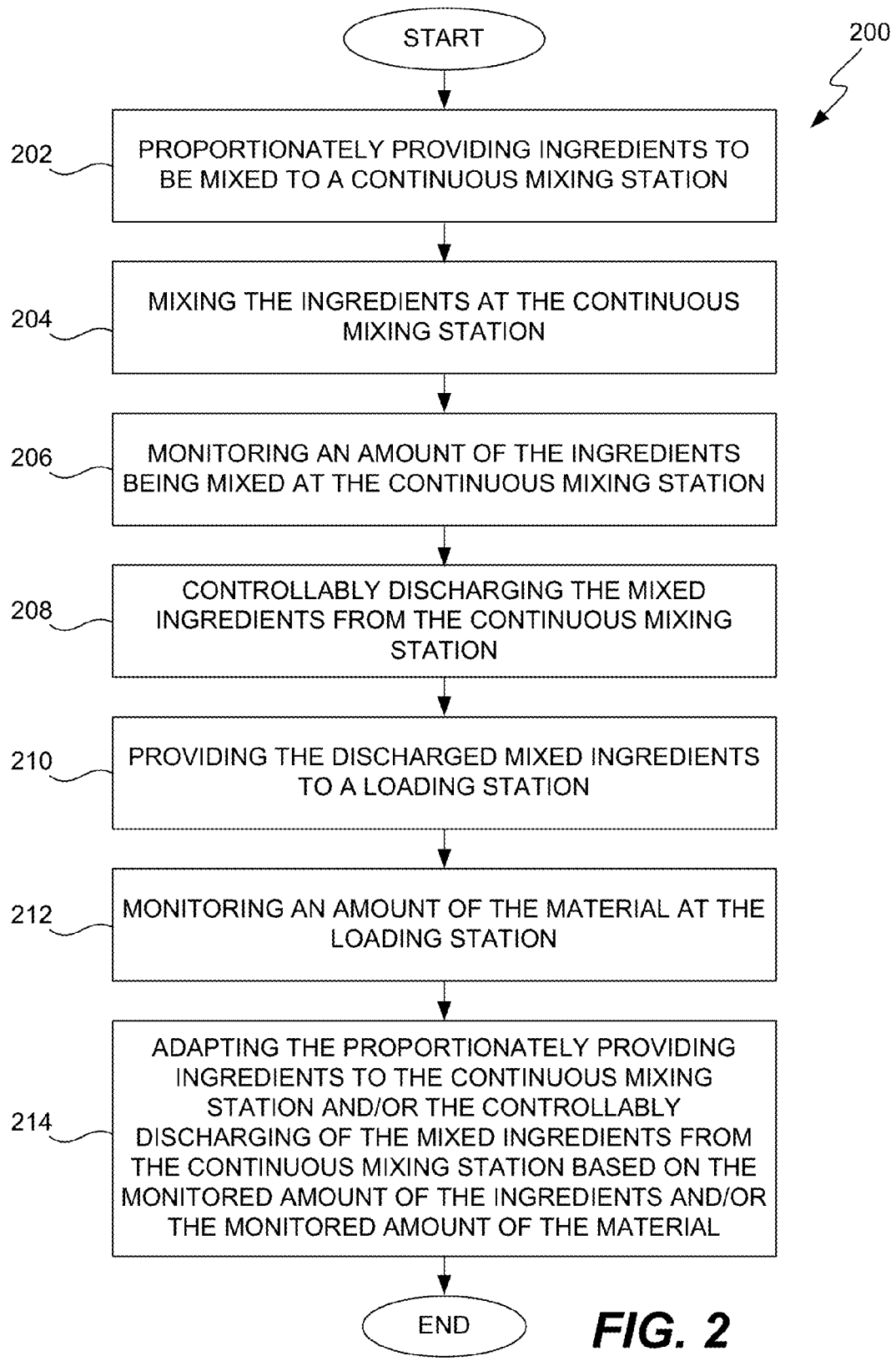
FIG. 2 illustrates a flow diagram of a concrete production process according to one embodiment.

FIG. 2 illustrates a flow diagram of a concrete production process 200 according to one embodiment. The concrete production process 200 makes use of a mixing station and a loading station. The mixing station can include a mixer, such as continuous mixer, and can operate to mix various components used in making concrete and, once mixed, the mixture (which can also be referred to as grout) can be provided to the loading station which facilitates loading of the mixture into a concrete transport vehicle. When the mixing station includes a continuous mixer, the mixing station can be referred to as a continuous mixing station. The concrete production process 200 can be performed by a control system of a concrete production system, such as the control system 108 illustrated in FIG. 1A or the control system 188 illustrated in FIG. 1B.

The concrete production process 200 can proportionately provide 202 ingredients to be mixed to the continuous mixing station. The ingredients to be mixed can, for example, include common ingredients for producing concrete, namely, sand, water and cement. Fly ash is another ingredient that could be included. The ingredients can then be mixed 204 at the continuous mixing station. In addition, an amount of the ingredients being mixed at the continuous mixing station can be monitored, 206. For example, a sensor (such as a scale or load cell) can be provided at the continuous mixing station and used to monitor the amount of the ingredients being mixed at the continuous mixing station. In addition, the concrete production process 200 can also controllably discharge 208 the mixed ingredients from the continuous mixing station. The mixed ingredients can be referred to as grout (concrete without aggregate). The discharged mixed ingredients can be provided 210 to the loading station. Aggregate can be added to the mixed ingredients at the loading station. The amount of the material at the loading station can also be monitored 212. For example, a sensor (such as a scale or load cell) can be used to monitor the amount of material at the loading station. Additionally, to provide dynamic control or feedback control, the concrete production process 200 can also operate to adapt 214 the proportionately provided ingredients to the continuous mixing station, and/or the controllable discharge of the mixed ingredients from the continuous mixing station. The adapting 214 can be based on the monitored amount of the ingredients being mixed at the continuous mixing station and/or the monitored amount of material at the loading station. Following the adapting 214, the concrete production process 200 can end.

The concrete production process 200 can typically be performed on a continuous basis during the production of a batch of concrete. The production of a batch of concrete is produced in a continuous mode such that as ingredients are provided to the continuous mixing station, the ingredients are mixed. Once the ingredients have been fully mixed, the mixed ingredients are output to the loading station for subsequent delivery to a transport device. The adapting 214, as needed, can be automatically performed. The adapting 214 is typically performed continuously during the concrete production process 200 so as to provide dynamic feedback control as the batch of concrete is being produced. The dynamic feedback can also be referred to as closed-loop feedback.

FIGS. 3A-3D illustrate flow diagrams of a concrete production process 300 according to one embodiment. The concrete production process 300 makes use of a mixer and a loading hopper. The mixer operates to mix various components used in making concrete and, once mixed, the mixture can be provided to the loading hopper which facilitates loading of the concrete into a concrete transport vehicle. The mixer operates to mix together ingredients for a batch of concrete being produced. For a given concrete batch design, proportionate quantities of the mixed ingredients are directed into the mixer where they are mixed. In one embodiment, the mixer is a continuous mixer, such as a batch discharge mixer. The concrete production process 300 can be performed by a control system of a concrete production system, such as the control system 108 illustrated in FIG. 1A and the control system 188 illustrated in FIG. 1B.

The concrete production process 300 can begin with a decision 302 that determines whether excess material is present at the loading hopper. When the decision 302 determines that access material is present at the loading hopper, a decision 304 can determine whether the loading hopper is presently overloaded. When the decision 304 determines that the loading hopper is not presently overloaded, the rate of delivery of mixed ingredients to the mixer for a batch of concrete to be produced can be decreased 306. In addition, the rate of discharge of the mixed ingredients from the mixer can be decreased 308. By decreasing 308 the rate of discharge from the mixer, the production of the concrete is slowed and, as a result, the delivery of material to the loading hopper is slowed. Consequently, the concrete production process 300 can manage (e.g., reduce) the amount of material at the loading hopper. Additionally, the production of the concrete can also include aggregate in the final concrete. Hence, in such an embodiment, the rate of delivery for the aggregate to the loading hopper can also be decreased 310 when the decision 302 determines that access material is present at the loading hopper. Since the aggregate is proportionately provided and eventually combined with the mixed ingredients from the mixer, as the discharge rate from the mixer is decreased 308, the delivery rate of the aggregate to the loading hopper should also be correspondingly decreased 310.

Alternatively, when the decision 304 determines that the loading hopper is presently overloaded, the concrete production process 300 can perform control actions to prevent or mitigate further overloading of the loading hopper. In particular, when the decision 304 determines that the loading hopper is overloaded, delivery of the ingredients being provided to the mixer can be stopped 312. Also, the discharge of the mixed ingredients from the mixer can also be stopped 314 when the decision 304 determines that the loading hopper is overloaded. Further still, the delivery of the aggregate to the loading hopper can also be stopped 316. Following the block 310 or 316, the concrete production process 300 can proceed to a decision 326 which is described below.

On the other hand, when the decision 302 determines that access material is not present at the loading hopper, a decision 318 can determine whether there is insufficient material at the loading hopper. When the decision 318 determines that there is sufficient (not insufficient) material at the loading hopper, the concrete production process 300 can proceed to the decision 326. Alternatively, when the decision 318 determines that there is insufficient material at the loading hopper, the concrete production process 300 can take certain actions to cause additional material to arrive at the loading hopper. In this regard, the rate of delivery of the mix ingredients to the mixer for the batch of concrete being produced can be increased 320. Further, the rate of discharge of the mixed ingredients from the mixer can be increased 322. By increasing 322 the rate of discharge from the mixer, the production of the concrete is sped up and, as a result, the delivery of material to the loading hopper is faster. Consequently, the concrete production process 300 can manage (e.g., increase) the amount of material at the loading hopper. Further still, the delivery rate of the aggregate to the loading hopper can also be increased 324 when the decision 318 determines that insufficient material is present at the loading hopper. Since the aggregate is proportionately provided and eventually combined with the mixed ingredients from the mixer, as the discharge rate from the mixer is increased 322, the delivery rate of the aggregate to the loading hopper should also be correspondingly increased 324. Following the block 324, the concrete production process 300 can proceed to the decision 326.

Figure 3A:
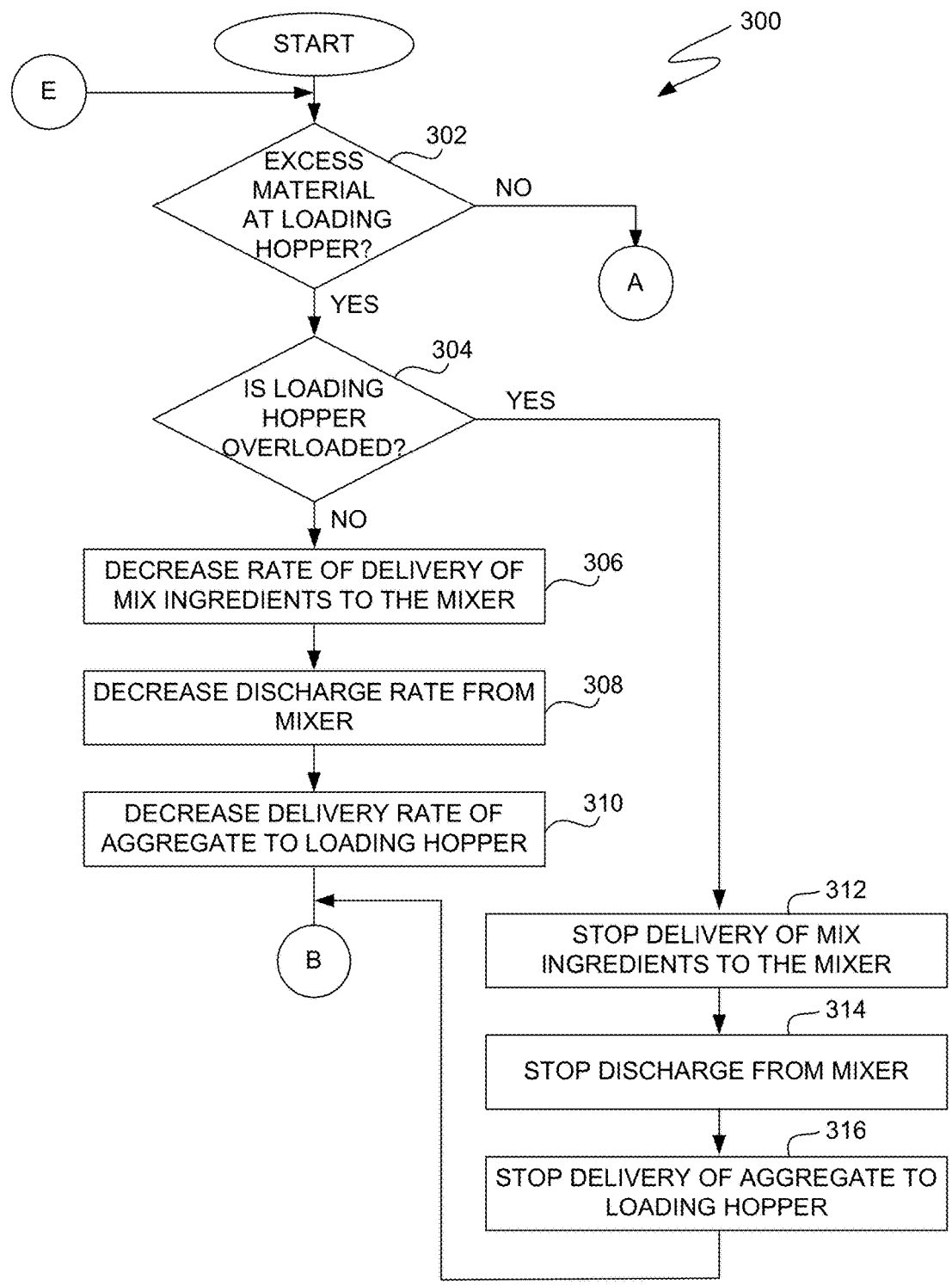
FIGS. 3A-3D illustrate flow diagrams of a concrete production process according to one embodiment.
Figure 3B:
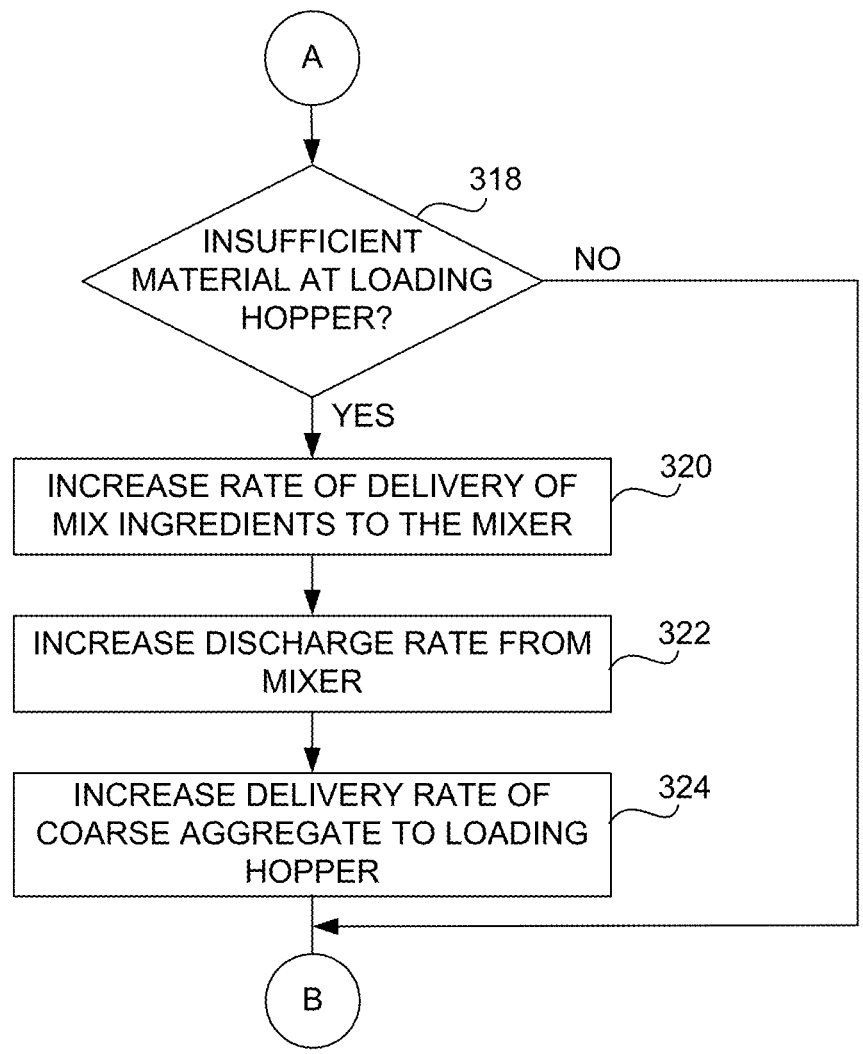
Figure 3C:
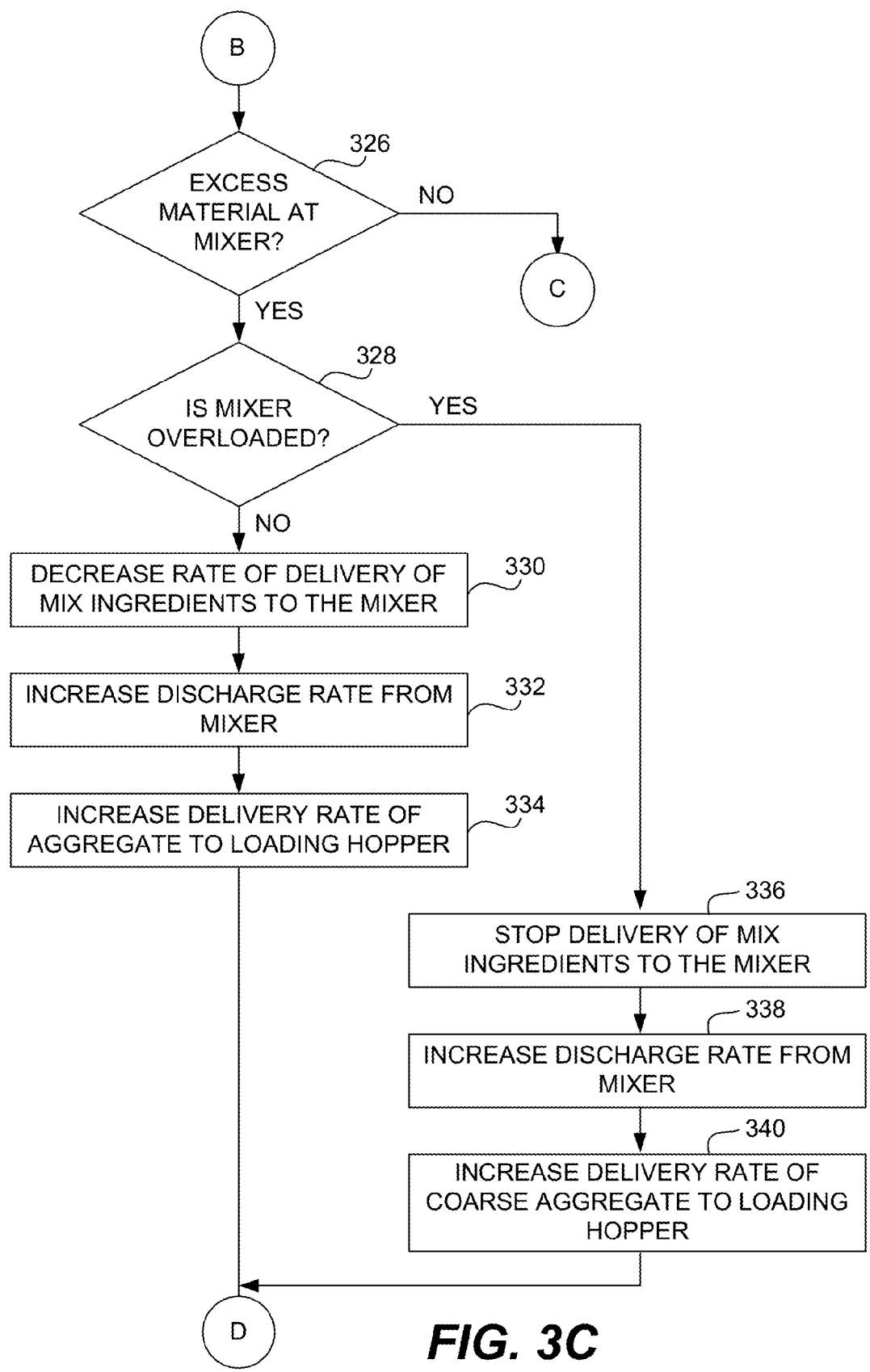
Figure 3D:
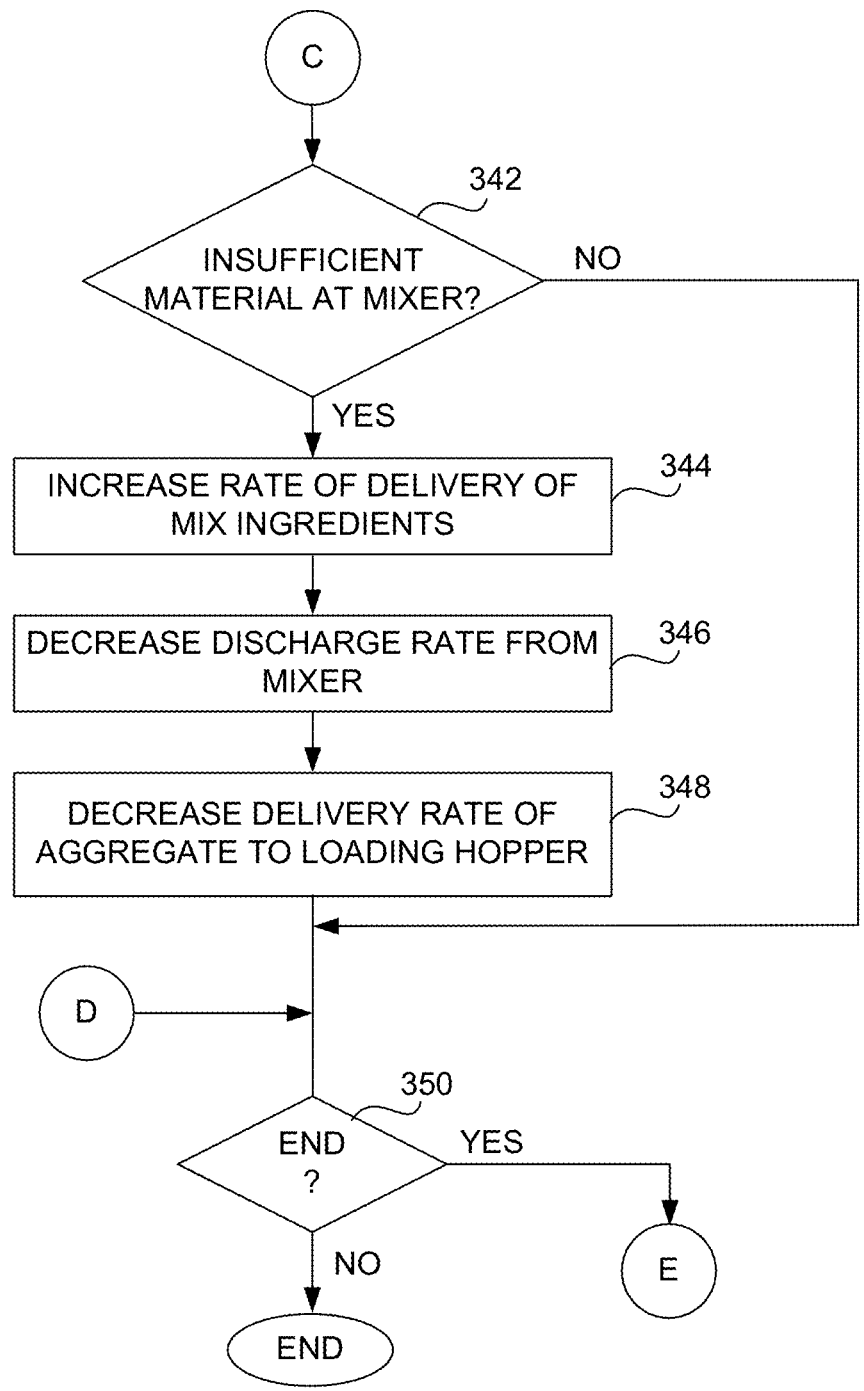

In addition to the processing illustrated in FIGS. 3A and 3B concerning the amount of material present at the loading hopper, the concrete production process 300 can also perform processing illustrated in FIGS. 3C and 3D concerning management of the amount of material present at the mixer.

As illustrated in FIG. 3C, a decision 326 can determine whether excess material is present at the mixer. When the decision 326 determines that excess material is present at the mixer, a decision 328 can determine whether the mixer is overloaded. When the decision 328 determines that the mixer is not presently overloaded, the concrete production process 300 can perform actions to reduce the amount of material present at the mixer. In this regard, the rate of delivery of the mixed ingredients to the mixer for the batch of concrete being produced can be reduced 330 since there is presently excess material at the mixer. In addition, the discharge rate of the mixed ingredients from the mixer can be increased 332. Further still, if the embodiment further provides aggregate to the loading hopper, the delivery rate of the aggregate to the loading hopper can be increased 334.

Alternatively, when the decision 328 determines that the mixer is presently overloaded, the concrete production process 300 can perform actions to stop 336 (or aggressively decrease) the amount of material present at the mixer. In this regard, the delivery of the mixed materials to the mixer can be stopped 336. Additionally, the discharge rate from the mixer can be increased 338. In addition, if the embodiment provides aggregate to the loading hopper, the delivery rate of the aggregate to the loading hopper can be increased 340. Following the blocks 334 or 340, the concrete production process 300 can proceed to a decision 350 which is discussed below.

On the other hand, when the decision 326 determines that excess material is not present at the mixer, a decision 342 can determine whether insufficient material is present at the mixer. When the decision 342 determines that insufficient material is present at the mixer, the concrete production process 300 can perform actions to increase the amount of material at the mixer. In this regard, the rate of delivery of the mixed materials to the mixer for the batch of concrete being produced can be increased 344. In addition, the discharge rate from the mixer can be decreased 346. Further still, if the embodiment provides aggregate to the loading hopper, the delivery rate of the aggregate to the loading hopper can be decreased 348.

Alternatively, when the decision 342 determines that sufficient material is present at the mixer, the blocks 344-348 can be bypassed. Following the block 348, or its being bypassed, a decision 350 can determine whether the concrete production process 300 should end. When the decision 350 determines that the concrete production process 300 should end, the concrete production process 330 can end. On the other hand, when the decision 350 determines that the concrete production process 300 should not and, the concrete production process 300 can return to repeat the decision 302 and subsequent blocks so that the concrete reduction process 300 can continue to operate to manage the concrete production process 300 and, in doing so, managing the amount of material present at the loading hopper and or the mixer.

Figure 4:
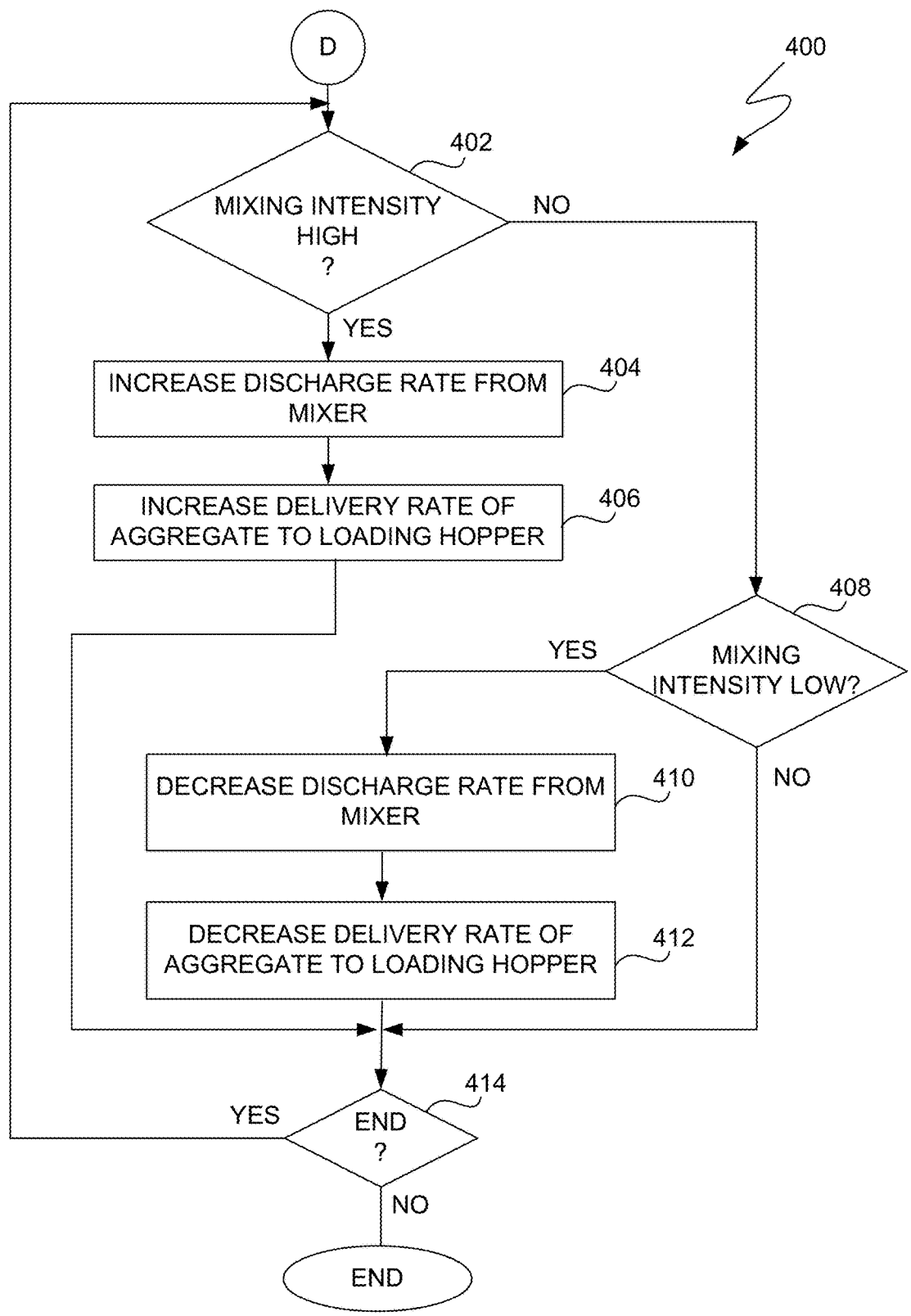
FIG. 4 is a flow diagram of a mixing intensity control process according to one embodiment.

FIG. 4 is a flow diagram of a mixing intensity control process 400 according to one embodiment. The mixing intensity control process 400 can be used separately or in conjunction with the concrete production process 300 illustrated in FIGS. 3A-3D. The mixing intensity control process 400 operates to manage the mixing intensity for a mixer that is utilized in the production of concrete.

The mixing intensity control process 400 can begin with a decision 402 that determines whether the mixing intensity for the mixer is high. When the decision 402 determines that the mixing intensity for the mixer is high, a discharge rate from the mixer can be increased 404. In addition, if the production of concrete also supplies aggregate to a loading hopper, the delivery rate of aggregate to the loading hopper can be increased 406.

Alternatively, when the decision 402 determines that the mixing intensity for the mixer is not high, a decision 408 can determine whether the mixing intensity for the mixer is low. When the decision 408 determines that the mixing intensity is low, the discharge rate from the mixer can be decreased 410. In addition, if the production of concrete also supplies aggregate to a loading hopper, the delivery rate of the aggregate to the loading hopper can be decreased 412. Following the block 406 or the block 412, the mixing intensity control process 400 can perform a decision 414. Also, following the decision 408 when the mixing intensity is not low, then mixing intensity need not be adjusted, and the mixing intensity control process 400 can proceed directly to the decision 414. The decision 414 can determine whether the mixing intensity control process 400 should end. When the decision 414 determines that the mixing intensity control process 400 should not end, the mixing intensity control process 400 can return to repeat the decision 402 and subsequent blocks so that the mixing intensity can be dynamically adjusted during the production of concrete. Alternatively, when the decision 414 determines that the mixing intensity control process 400 should end, the mixing intensity control process 400 ends.

Figure 5:
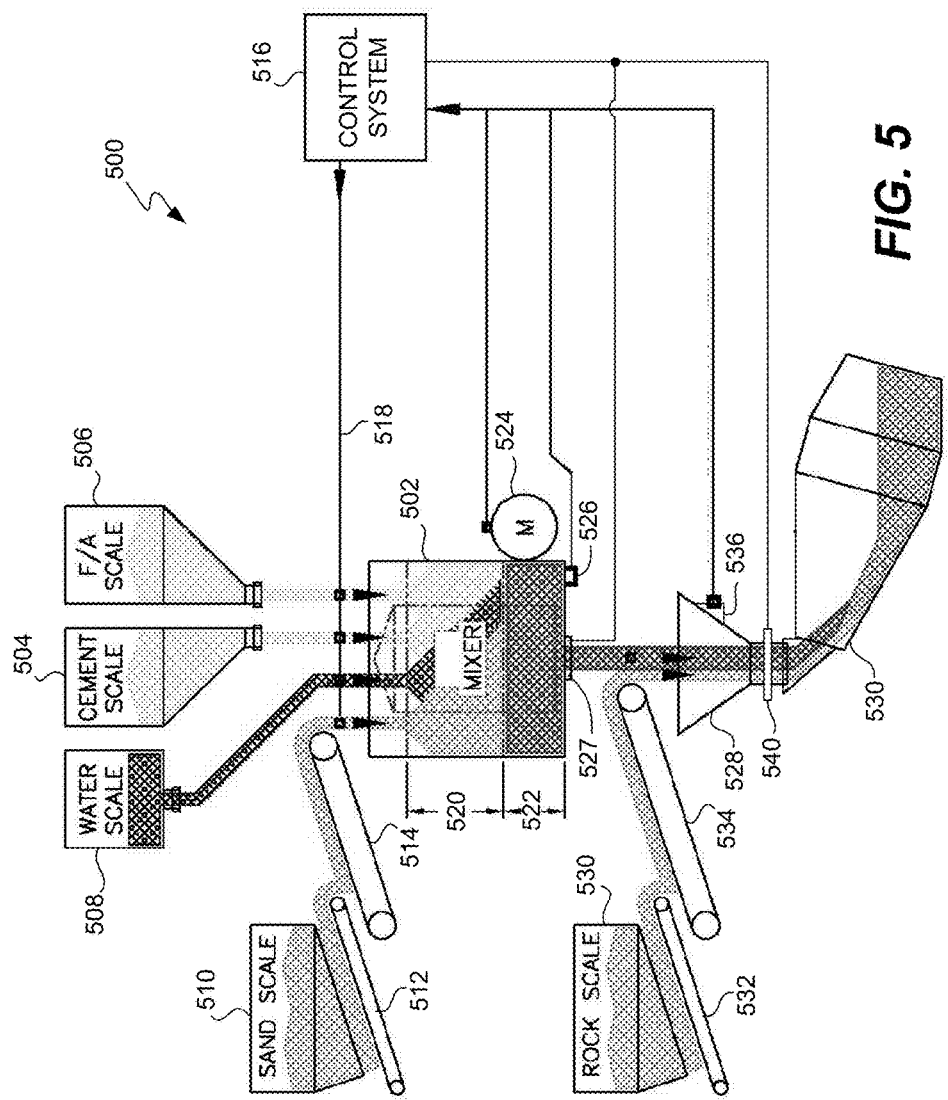
FIG. 5 is a schematic diagram of a concrete production system according to one embodiment.

FIG. 5 is a schematic diagram of a concrete production system 500 according to one embodiment. The concrete production system 500 operates to produce concrete through a mixing action. The mixing action is provided by a mixer 502. The concrete production system 500 includes a cement container 504 having a cement scale, a fly ash container 506 having a fly ash scale, and a water container 508 having a water scale. In addition, the concrete production system 500 includes a sand container 510 having a sand scale. The cement, flash, water and sand can all be deposited into the mixer 502. The sand from the sand container 510 can utilize a first conveyor 512 and a second conveyor 514 to deliver the sand to the mixer 502.

The concrete production system 500 can also include a control system 516. One task of the control system 516 can be to regulate the proportionate amounts of cement, fly ash, water and sand delivered to the mixer 502. The control system 516 can produce ingredient control signals 518 that can be used to regulate the proportionate amounts in view of the scale data provided by the associated scales. The scale data can also be provided to the control system 516, though not illustrated in FIG. 5.

Once the various ingredients have been delivered to the mixer 502, the ingredients can be blended at a blending region 520, and then later further mixed at a resident mixing bed 522. The mixer 502 can be controlled by a mixer motor 524 under the control of the control system 516. The mixer motor 524 can also provide feedback to the control system 516 to evaluate the load on the motor which can correlate to mixing intensity. The mixer 502 can also include a mixing bed sensor 526 that can monitor the weight of the ingredients being mixed at the resident mixing bed 522. The mixing bed sensor 526 can supply data back to the control system 516.

The mixed ingredients (i.e., grout) output by the mixer 502 can be regulated by a mixer discharge gate 527. The control system 516 can control the mixer discharge gate 527. In any case, the mixed ingredients (i.e., grout) output by the mixer 502, to the extent permitted by the mixer discharge gate 527, can be delivered to a truck loading hopper 528. Additionally, a rock container 530 can supply rock to the truck loading hopper 528. The rock can be supplied to the truck loading hopper 528 by way of a first conveyor 532 and a second conveyor 534. The rock container 530 can include a rock scale to measure the weight of rock. In addition, the truck loading hopper 528 can include a load sensor 536. The load sensor 536 can be electrically connected to the control system 516. The rock and the mixed ingredients (i.e., grout) provided to the truck loading hopper 528 can be supplied to a mixing drum 538, wherein the rock and the mixed ingredients can be further mixed by a tumbling action. The truck loading hopper 528 can also include a discharge mechanism 540, which can be controlled by the control system 516.

Figure 6:
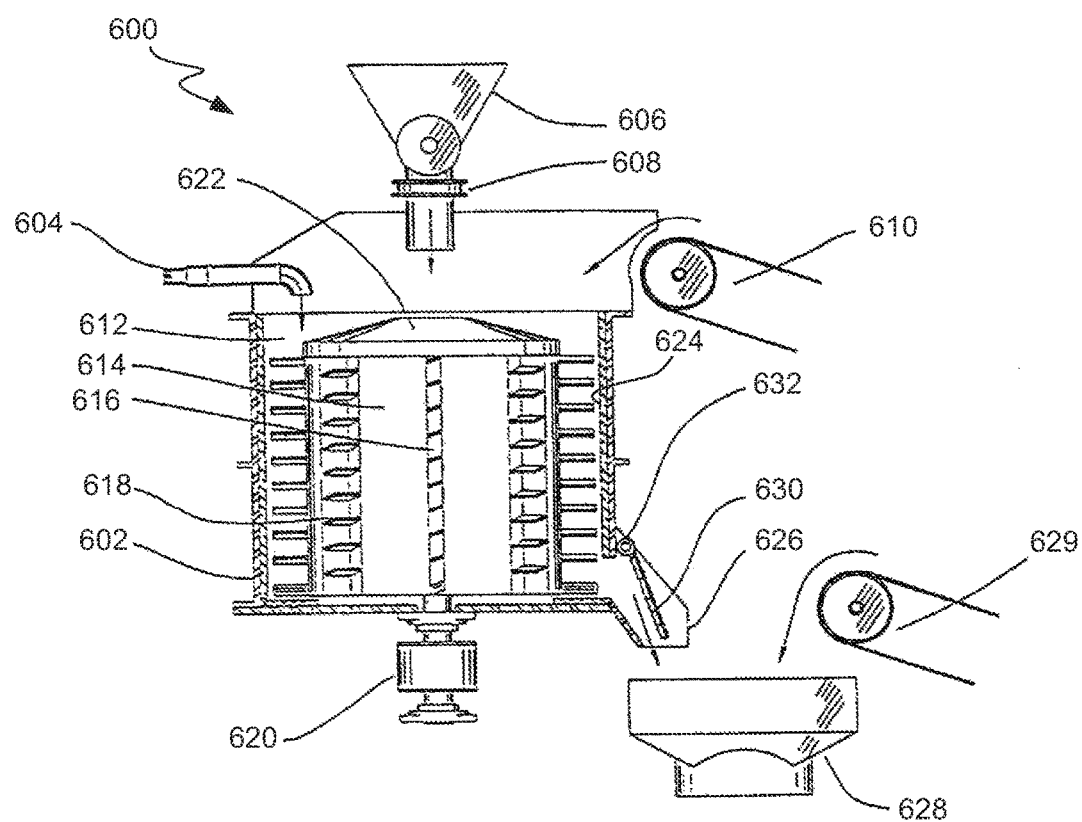
FIG. 6 shows a cross-section of a mixer arrangement according to one embodiment.

FIG. 6 shows a cross-section of a mixer arrangement 600 according to one embodiment. The mixer arrangement 600 includes a mixer 602 that can represent the mixer 160 illustrated in FIG. 1B or the mixer 502 illustrated in FIG. 5.

The mixer 602 is a vertically oriented continuous mixer that can provide high intensity mixing. The mixer 602 may have a capacity from 0.25 yard to 2 cubic yards. For example, the mixer 602 can have a capacity of 0.72 cubic yard. The mixer 602 can receive metered water from water pipe 604, cement from a cement hopper 606 through a discharge apparatus 608, and sand from a sand conveyor 610, all automatically controlled by a control system (e.g., computer) to introduce the desired quantities of such ingredients into the mixer 602 using the controllable variable rate sources.

Inside the mixer 602 there is a mixing chamber 612 within which a mixing head 614 rotates about a vertical shaft 616. On the periphery of the mixing head 614 are a multiplicity of short blades 618 extending into the mixing chamber 612. A satisfactory array of the short blades 618 is ten vertical lines of blades around mixing head 614, with ten blades per vertical line. The shaft 616 may be rotated at a speed variable between 100 and 1200 RPM drum by a motor 620. The clearance between the blade tips and the inside wall of the mixing chamber 612 may conveniently be between 0.125 and 0.010 inches. The mixing head 614 has a cap 622 which serves to direct incoming materials to the mixing chamber 612 for mixing by means of the short blades 618.

Because this mixer 602 is much smaller than traditional batch size mixers, longer wear materials may be used without the cost of the plant being prohibitive. Thus, the short blades 618 can be made of hardened D2 steel. The mixing chamber 612 can have a lining 624 is preferably made of ceramic such as aluminum oxide. A lower deck of mixer 602, onto which the mixed ingredients fall during mixing and before discharge, can be coated with tungsten carbide. When the ingredients (e.g., grout) has been thoroughly mixed in the mixer 602, the mixed ingredients can be discharged through a chute 626 into a truck load hopper 628. A conveyor 629 can also provide aggregate to the truck load hopper 628. The energy (e.g., horsepower) absorbed during mixing is controlled by means of a discharge gate 630, which is mounted on the mixer 602 by hinge means 632. The discharge gate 630 may be controlled by the computer (not shown) signaling, for example, an air cylinder to open or close the discharge gate 630 to allow more or less back pressure against the flow of the mixed ingredients (e.g., grout) through the mixer 602. The discharge gate 630 can control the energy (e.g., horsepower) absorbed by the mixture in the mixer 602.

Figure 7:
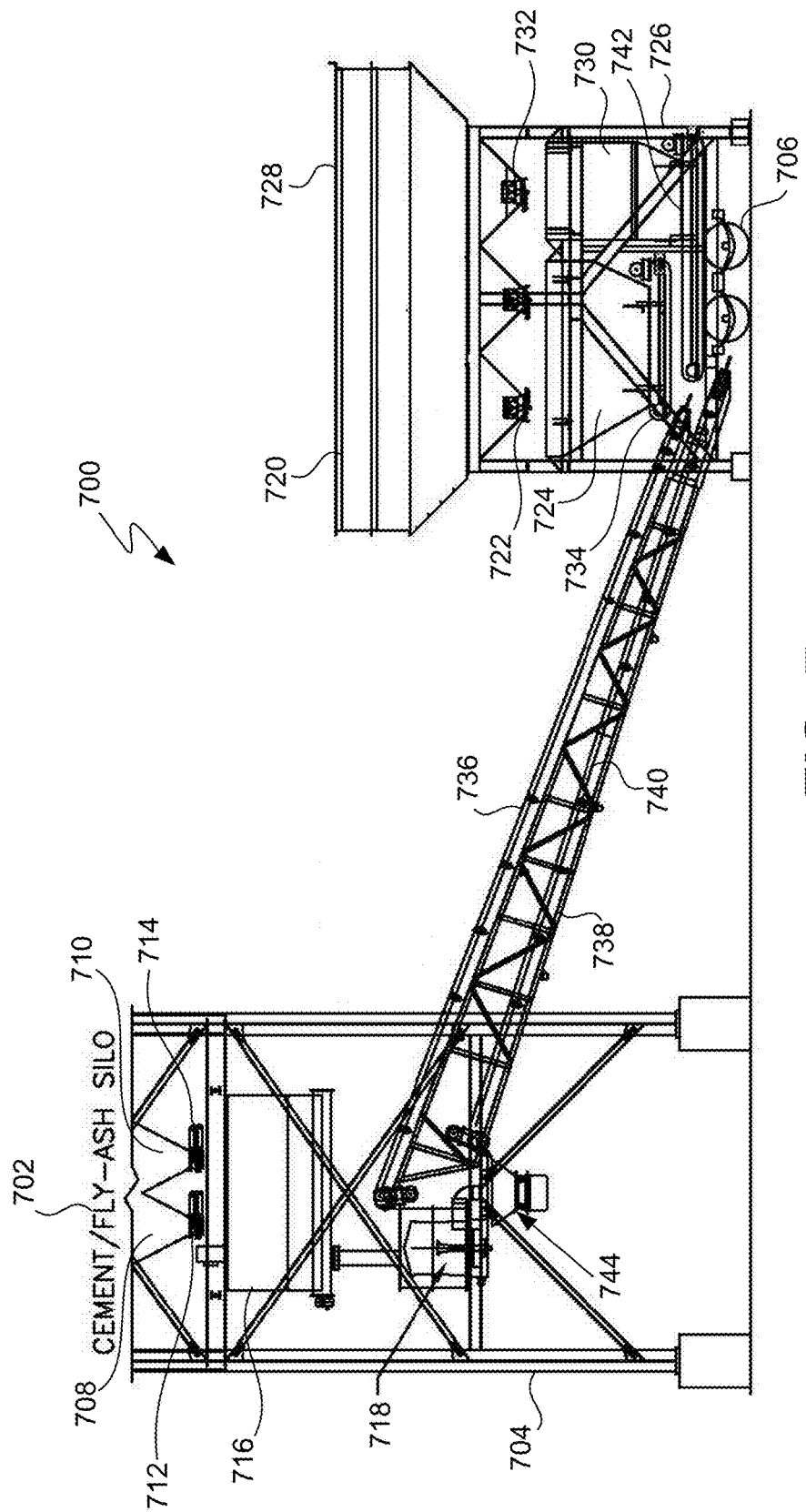
FIG. 7 illustrates a concrete plant according to one embodiment.

FIG. 7 illustrates a concrete plant 700 according to one embodiment. Although the concrete plant 700 can is provided as a stationary plant, it should be recognized that the concrete plant 700 could alternatively be provided as a portable concrete plant.

The concrete plant 700 includes a cement storage container 702 (partially shown), which, if desired, may be divided into two or more compartments (not shown) for separately storing cement and fly ash, for example. The cement storage container 702 is permanently attached to a stand 704 having three or more legs to support the cement storage container 702 in an upright manner during use. The cement storage container 702 and the stand 704 may be towed to a jobsite by means of wheels 706. The cement storage container 702 has a cement storage bin 708 and a fly ash storage bin 710. At the bottom of the cement storage bin 708 is a closable egress 712, and at the bottom of the fly ash storage bin 710 is a closable egress 714. The closable egresses 712 and 714 can be controlled by a control system. The closable egresses 712 and 714 of the cement storage container 702 allows gravity feed of cement and/or fly ash of the cement storage container 702 to a cement weigh hopper 716, which measures a desired amount of cement and/or fly ash by weight. When the predetermined amount of cement and/or fly ash enters the cement weight hopper 716, the closable egress 712 or 714 automatically closes. The metering of quantities of ingredients in the mixing process is controlled by the control system (not shown). At the bottom of the cement weight hopper 716 is a scale for dispensing the desired amount of cement and/or fly ash into a mixer 718. Water from an external source also enters the mixer 718 in a controllable manner. A metering valve 24, controlled by the control system, allows the amount of water for the desired concrete mixture to be provided to the mixer 718. Alternatively, a scale may be used to weigh the required amount of water.

Another ingredient to form concrete is sand, which is stored in sand bin 720 having a closable egress 722 for gravity feeding sand weigh hopper 724. The sand bin 720 and the sand weigh hopper 724 are mounted on a stand 726, which in turn can be secured to the wheels 706 for portability. Also mounted on the stand 726 is a rock bin 728 positioned above a rock weigh hopper 730. Aggregate in the rock weigh hopper 730 can be gravity feed into the rock weigh hopper 730 through closable egress 732.

Sand from the sand bin 720 drops to the sand weigh hopper 724 when permitted by the closable egress 722. The sand from sand weigh hopper 724 falls on a short sand conveyor 734, which has a variable speed drive controlled by the control system and passes the sand to a long sand conveyor 736 which introduces the sand to the mixer 718 along with cement, fly ash and water. The long sand conveyor 736 is carried on a boom 738. Also carried on the boom 738 is long rock conveyor 740, which is fed rock from a short rock conveyor 742. Rock from the rock bin 728 drops to the rock weigh hopper 33 when permitted by the closable egress 722. The rock from the rock weigh hopper 724 falls on a short rock conveyor 742, which has a variable speed drive controlled by the control system. Rock proceeds to the long rock conveyor 740 which dispenses it into truck load hopper 744. After the grout has been thoroughly mixed in mixer 718, a concrete truck (not shown) is driven underneath stand 704, and grout from the mixer 718 is fed to the truck load hopper 744 along with rock from the long rock conveyor 736. The truck load hopper 744 directly passes the rock and the grout into a drum of the concrete truck.

The control system described herein can be implemented by software, hardware, or a combination of hardware and software. Embodiments of hardware can pertain to one or more sensors, electronic scales, microprocessors, controllers, motor controller, computers, memory. Embodiments of software can be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The various aspects, features, embodiments or implementations of the invention described above can be used alone or in various combinations.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A concrete mixing and loading system, comprising:
   a mixer;
   a material delivery subsystem configured to provide a plurality of ingredients for making concrete to the mixer;
   a mixer sensor coupled to the mixer and configured to sense an amount of material in the mixer being mixed;
   a rock container configured to hold rock;
   a rock sensor coupled to the rock container and configured to sense an amount of rock;
   a loading hopper configured to hold at least the mixed material from the mixer that is to be provided to a transport vehicle device;
   a conveyor configured to convey rock from the rock container to the loading hopper;
   a hopper sensor coupled to the loading hopper and configured to sense an amount of material in the loading hopper, the amount of material in the loading hopper including at least the mixed material from the mixer; and
   a control system operatively connected to the mixer sensor, the hopper sensor and a rock sensor, the control system controlling operation of one or more of the mixer and the material delivery subsystem based on data received from at least one of the mixer sensor, the hopper sensor and a rock sensor.

2. A concrete mixing and loading system as recited in claim 1, wherein the control system provides controlled loop feedback to the mixer to alter the discharge rate therefrom based on the amount of material sensed in the hopper sensor.

3. A concrete mixing and loading system as recited in claim 1, wherein the control system provides controlled loop feedback to the material delivery subsystem to alter a rate of delivery of the ingredients based on the amount of material sensed in the loading hopper.

4. A concrete mixing and loading system as recited in claim 1, wherein the control system provides controlled loop feedback to the mixer to alter the discharge rate therefrom based on the amount of material sensed in the mixer being mixed.

5. A concrete mixing and loading system as recited in claim 1, wherein the control system provides controlled loop feedback to the material delivery subsystem to alter a rate of delivery of the ingredients based on the amount of material sensed in the mixer being mixed.

6. A concrete mixing and loading system as recited in claim 1, wherein the hopper sensor comprise a scale, and wherein the mixer sensor comprises a scale.

7. A concrete mixing and loading system as recited in claim 1, wherein the mixer includes or couples to a controllable a discharge gate.

8. A concrete mixing and loading system as recited in claim 1,
wherein the plurality of ingredients for making concrete provided to the mixer include water, sand, cement and fly ash, and
wherein the concrete mixing and loading system further comprises:
an aggregate delivery subsystem configured to provide aggregate to the loading hopper concurrently with the delivery to the loading hopper of the mixed material from the mixer.

9. A concrete mixing and loading system as recited in claim 1, wherein the mixer is a continuous mixer.

10. A concrete mixing and loading system as recited in claim 9, wherein the continuous mixer is a batch discharge continuous mixer.

11. A concrete mixing and loading system as recited in claim 1, wherein the control system is configured to:
control proportionate delivery of the ingredients to be mixed to the mixer by the material delivery subsystem;
control mixing of the ingredients at the mixer;
monitor, via the mixer sensor, the amount of material in the mixer being mixed at the mixer;
controllably discharge the mixed ingredients from the mixer to the loading hopper;
monitor, via the hopper sensor, the amount of material in the loading hopper; and
adapt the proportionate delivery of the ingredients to the mixer and/or the controllably discharge of the mixed ingredients from the mixer to the loading hopper based on the monitored amount of the ingredients being mixed at the mixer and/or the monitored amount of the material at the loading hopper.

12. A concrete mixing and loading system as recited in claim 11, wherein the control system monitors the amount of material in the mixer by monitoring a weight of the ingredients being mixed at the mixer.

13. A concrete mixing and loading system as recited in claim 11, wherein the control system monitors the amount of material at the loading hopper by monitoring a weight of the material at the loading hopper.

14. A concrete mixing and loading system as recited in claim 11, wherein the material at the loading hopper includes at least the discharged mixed ingredients from the mixer that has not yet exited the loading hopper.

15. A concrete mixing and loading system as recited in claim 14, wherein the control system is configured to:
controllably discharge the material from the loading hopper.

16. A concrete mixing and loading system as recited in claim 14, wherein the control system is configured to:
control delivery of coarse aggregate to the loading hopper, and
wherein the material at the loading hopper includes at least the discharged mixed ingredients from the mixer and the coarse aggregate that has not yet exited the loading hopper.

17. A concrete mixing and loading system as recited in claim 16, wherein the control system is configured to:
controllably discharge the material from the loading hopper.

18. A concrete mixing and loading system as recited in claim 16, wherein the transport vehicle is a truck.

19. A concrete mixing and loading system as recited in claim 1, wherein the control system couples to the hopper sensor to monitor the amount of material at the loading hopper by monitoring a weight of the material at the loading hopper.

20. A concrete mixing and loading system as recited in claim 19, wherein the material at the loading hopper includes at least the discharged mixed ingredients from the mixer that has not yet exited the loading hopper.

21. A concrete mixing and loading system as recited in claim 20, wherein the control system couples to the mixer sensor to monitor the amount of material in the mixer by monitoring a weight of the ingredients being mixed at the mixer.

22. A concrete mixing and loading system as recited in claim 21,
wherein the control system provides controlled loop feedback to the material delivery subsystem to alter a rate of delivery of the ingredients to the mixer based on the amount of material sensed in the loading hopper by the hopper sensor, and
wherein the mixer is a batch discharge continuous mixer.

* * * * *